United States Patent [19]
Johnson et al.

[11] Patent Number: 5,822,721
[45] Date of Patent: Oct. 13, 1998

[54] METHOD AND APPARATUS FOR FRACTAL-EXCITED LINEAR PREDICTIVE CODING OF DIGITAL SIGNALS

[75] Inventors: Steven A. Johnson; Sing-Wai Wu, both of Norcross, Ga.

[73] Assignee: Iterated Systems, Inc., Atlanta, Ga.

[21] Appl. No.: 577,540

[22] Filed: Dec. 22, 1995

[51] Int. Cl.$^6$ .............................. G10L 9/14; H03M 7/50
[52] U.S. Cl. ........................... 704/219; 704/262; 341/75; 382/249
[58] Field of Search ..................................... 395/2.1, 2.12, 395/2.28; 382/249; 704/201, 203, 219, 262; 341/75

[56] References Cited

U.S. PATENT DOCUMENTS

| | | | |
|---|---|---|---|
| Re. 34,247 | 5/1993 | Atal et al. | 704/218 |
| 4,941,193 | 7/1990 | Barnsley et al. | 382/249 |
| 4,953,214 | 8/1990 | Takeguchi et al. | 704/230 |
| 5,065,447 | 11/1991 | Barnsley et al. | 382/249 |
| 5,138,661 | 8/1992 | Zinser et al. | 704/219 |
| 5,253,341 | 10/1993 | Rozmanith et al. | 395/200.49 |
| 5,347,600 | 9/1994 | Barnsley et al. | 382/249 |
| 5,359,696 | 10/1994 | Gerson et al. | 704/223 |
| 5,371,853 | 12/1994 | Kao et al. | 704/223 |
| 5,384,891 | 1/1995 | Asakawa et al. | 704/220 |
| 5,384,893 | 1/1995 | Hutchins | 704/267 |
| 5,414,796 | 5/1995 | Jacobs et al. | 704/221 |
| 5,497,435 | 3/1996 | Berger | 382/249 |
| 5,721,543 | 2/1998 | Johnson et al. | 341/50 |

OTHER PUBLICATIONS

Bernd Hurtgen and Thomas Hain, "On the Convergence of Fractal Transforms," Proc. IEEE ICASSP '94, vol. V, p. 561–564, Apr. 1994.

Richard C. Dorf, The Electrical Engineering Handbook, 1993, 279–286.

Richard C. Rose and Thomas P. Barnwell III, The Self Excited Vocoder–An Alternate Approach To Toll Quality At 4800 bps, 1986 IEEE.

Per Hedelin and Thomas Eriksson, Interpolating The History Improved Excitation Coding for High Quality Celp Coding, 1995 IEEE.

Dror Nahumi and W. Bastiaan Klien, An Improved 8 KB/S RCEIP Coder.

R. Salami et al., Description Of The Proposed ITU–T 8 KB/S Speech Coding Standard.

Christian G. Gerlach, Very Low Complexity CELP Speech Coding With Adaptive Phase Codebooks.

Andrei Popescu, et al., CELP Coding Using Trellis–Coded Vector Quantization of the Excitation.

William Gardner, et al., QCELP: A Variable Rate Speech Coder for CDMA Digital Cellular.

Joseph P. Campbell, Jr., et al., The DOD 4.8 KBPS Standard (Proposed Federal Standard 1016).

EIA/TIA—PN2759.

*Primary Examiner*—David R. Hudspeth
*Assistant Examiner*—Talivaldis Ivars Šmits
*Attorney, Agent, or Firm*—Finnegan, Henderson, Farabow, Garrett & Dunner, L.L.P.

[57] ABSTRACT

A method for encoding and decoding digital signals, particularly speech signals, by separating the original signal into a linear and nonlinear portions, the nonlinear portion may have linear aspects. The linear portion is encoded by LPC techniques and the nonlinear portion is encoded by use of a fractal transform. The encoded signal consists of LPC filter coefficients and fractal transform coefficients. The encoded signal is decoded by separating the LPC coefficients and fractal coefficients, using the LPC coefficients to generate an LPC filter, decoding the fractal coefficients using a fractal transform decoding method to obtain an error signal, and exciting the LPC filter with the decoded error signal to obtain decoded digital signals.

28 Claims, 13 Drawing Sheets

METHOD AND APPARATUS FOR FRACTAL-EXCITED LINEAR PREDICTIVE CODING OF DIGITAL SIGNALS

BACKGROUND OF THE INVENTION

1. Field of the Invention

The present invention relates generally to digital signal processing, and more particularly, to coding, transmission, and decoding of digital speech signals. Specific applications include computer network communication, facsimile transmissions, and telecommunication systems.

2. Description of the Related Art

The transmission and reception of speech signals between distant locations is an important feature in modern society. The simplest method of transmitting a speech signal involves transmitting the actual speech signal. However, a significant drawback of this method is it requires a very large capacity transmission channel.

To reduce the capacity of the required transmission channel, speech signals are typically "coded." Coding a speech signal means altering the speech signal to a form more conducive to its storage or transmission medium. In practice, a speech signal is typically coded, transmitted over a medium (or stored) in coded form, and then decoded back to an understandable version of the original signal.

The telecommunications industry has developed a wide range of applications for speech signal coding, including regular telephone systems and scrambled military communication systems. The goal with all these systems is to transmit and receive a speech signal with the highest achievable intelligibility and quality using the least amount of data. In an attempt to reduce the amount of data required to be transmitted, the industry has developed several methods of coding speech signals.

One technique used to code a speech signal for transmission is Linear Predictive Coding (LPC). The LPC encoding process begins by generating numerical signals, known as "prediction filter coefficients," representing the actual speech signal. The prediction filter coefficients are preliminarily decoded to generate an "estimated" signal. The difference between the estimated signal and the initial speech signal is called an "error signal." The LPC encoding process is completed by regenerating the coefficients to minimize the error signal.

FIG. 1 is a flow diagram illustrating the LPC encoding process. First, at step 2, an actual speech signal is received. Then, in step 4, the data processor generates an initial set of prediction filter coefficients. Each prediction filter coefficient corresponds to the relative contribution of a past speech signal in generating the current estimated speech signal. In other words, the data processor retains a series of previously generated synthesized speech signals and accords them a weight indicative of their relative importance in predicting the current estimated speech signal. In general, the further back in time a synthesized speech signal was generated, the less value it has in predicting the current estimated speech signal. This process thus constitutes a type of weighted average.

The data processor uses the predictive filter coefficients to generate an estimated speech signal at step 6. Then, in step 8, the data processor subtracts the estimated speech signal from the received speech signal. At step 10, the processor determines if the difference between the received and estimated speech signal is as small as possible. This determination uses any one of several known techniques, such as autocorrelation or covariance, such that when the estimated signal is subtracted from the received speech signal, the energy level of the resultant error signal is minimized.

The LPC system selects those prediction filter coefficients that make the difference between the received and estimated speech signal as small as possible. If the error signal is not less than a predetermined maximum value, the predictive filter coefficients are modified, step 12, and steps 6–10 are repeated. When the error signal is less than the predetermined maximum value, the predictive filter coefficients are stored for transmission or retrieval, step 14. Since the coefficients can be represented using much less data than the original speech signal, significant compression results.

After the prediction filter coefficients are transmitted, they are decoded back into a signal representative of the original speech signal by a linear predictive decoder 200, shown in FIG. 2. LPC decoder 200 receives the prediction coefficients and stores them in predictive filter section 206. In the classic LPC system, an "excitation signal" is inputted to predictive filter 206, which uses the excitation signal to generate an output synthesized signal 208. The excitation signal may be formed as the sum of a white noise signal generated by a white noise generator 202 and a pulse train signal generated by pulse train generator 204. White noise generator 202 is a machine that produces a random energy signal. The pulse train generator 204 is a machine that produces a series of predetermined energy signals.

In the manner shown by FIGS. 1 and 2, the prior art LPC procedure constructed an understandable speech signal requiring a much lower capacity transmission channel. For example, this LPC procedure typically lowered the required transmission rate from approximately 64 kbps (thousand bits per second), to approximately 2.4 kbps. However, the LPC process results in synthesized speech signals of low intelligibility and quality.

The unnatural sound of the synthesized LPC speech signal is partially due to the fact that the excitation signal used at decoder 200 lacks any correspondence to the original speech signal. In an effort to increase the intelligibility and quality of the synthesized speech, coders have been developed with the ability to transmit the error signal in addition to the prediction filter coefficients. The decoder uses the error signal as its excitation signal. Using the error signal allows the decoder to produce synthesized speech that more closely corresponded to the original speech pattern. Theoretically, if the error signal could be perfectly reproduced, the decoder could exactly duplicate the original speech signal.

Transmitting the complete error signal is not a satisfactory solution to the low synthesized speech quality problem of the LPC decoder, however, because doing so increases the amount of data to be transmitted back up to the level of the original speech signal. To help overcome this problem, the error signal, like the original speech signal, is coded. This method of speech signal processing is generally known as Analysis-by-Synthesis LPC (ABS-LPC).

One typical example of an ABS-LPC is a code-excited linear prediction (CELP) system. The CELP system is now generally considered to be the best available technique for speech synthesis.

A flow chart of the method of operation of a CELP system is shown in FIGS. 3a and 3b. In this method, step 20 consists of pre-generating a "codebook" and loading the codebook into the memory of a data processor. The codebook represents an index or database of an ensemble of possible error signals, called "codewords." This coding process begins by the reception of a digital signal, step 22. Next, the data processor initializes both the predictive filter and codeword, the initial codeword representing a particular error signal of the pre-generated codebook, step 24 and 26. In step 28, the data processor generates, from the codebook, a model excitation signal identified by the codeword and excites the predictive filter. The excited filter produces a synthesized speech signal.

Steps 30–34 comprise the LPC analysis described above in FIG. 1 steps 8–12. At step 34, the ABS-LPC differs from the classic LPC in that the actual error signal is compared to each possible model in the codebook to identify the best model through use of a codeword. Steps 28–32 are then repeated using the newly identified codeword.

If the error signal is less than a predetermined limit value, the prediction filter coefficients and the codeword that represents the excitation function are stored for transmission or retrieval at step 36. Therefore, the CELP works by developing the prediction filter coefficients and a codeword.

The decoding method is shown in FIG. 3b. The coded digital signal (comprising prediction filter coefficients and a codeword) is received at step 38. The prediction filter coefficients are separated from the codeword at step 40. Next, the data processor uses the codeword to find the modeled error signal estimate that is stored in a corresponding codebook, step 42. At step 44, the prediction filter coefficients are used to generate the predictive filter. An output synthesized speech signal is formed at step 46 by using the estimated error signal to excite the generated predictive filters.

While providing more correspondence between the original speech and synthesized speech then the classic LPC, the CELP still has drawbacks. One drawback is that the synthesized speech signal does not duplicate the original speech. This is because current methods of estimating the error signal use codebooks of prestored representative speech patterns. These methods do not compensate for individual accents, local dialects, or the nonlinearities of speech developed because of turbulent air flow in the vocal tract. Another problem is that the CELP process requires significant computer power to store and search the codebook.

It is desirable to provide improved methods and apparatus for processing and synthesizing speech signals which transmit the maximum amount of information in the minimum transmission bandwidth. It is further desirable to provide such methods and apparatus which reduce limitations on quality and intelligibility caused by individual accents, local dialects, and nonlinearities of speech signals. It is additionally desirable to provide such methods and apparatus which reduce demands on computer power.

SUMMARY OF THE INVENTION

The advantages and purpose of this invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the present invention provides improved methods and apparatus for representing digital signals, regenerating represented digital signals, and any combination thereof. Specifically, the present invention comprises a method comprising the steps of receiving a digital speech signal and encoding the received digital signal using LPC methods to separate and encode a linear portion of the received digital signal is coded using LPC methods to obtain a set of LPC prediction filter coefficients. A residual portion of the received digital signal is coded using a fractal transform procedure to obtain an encoded error signal. The present invention supplies the combination of the prediction filter coefficients and the encoded error signal as the encoded digital speech signal.

Another aspect of the present invention comprises a method comprising the steps of receiving an encoded digital signal and separating the encoded signal into a prediction filter coefficients portion and an encoded error signal portion. The encoded error signal portion is decoded using a fractal transformation procedure to generate an error signal. The prediction filter coefficients are used to generate a predictive filter. The generated error signal is used to excite the predictive filter to synthesis a digital signal.

BRIEF DESCRIPTIONS OF THE DRAWINGS

The accompanying drawings, which are incorporated in and constitute a part of this specification, illustrate embodiments of the invention, and, together with the description, serve to explain the principles of the present invention.

DESCRIPTION OF THE PREFERRED EMBODIMENT

Current methods of processing digital signals use linear estimations for coding digital signals. The present invention, however, uses a linear estimation for the linear portions of the digital signal and a nonlinear estimation for any remaining portions of the digital signal.

The preferred embodiment of the present invention employs this method on synthesized speech systems. In existing systems, linear predictive analysis is performed and an error signal is generated. The error signal is compared to pre-determined speech patterns stored in computer memory. The ensemble of stored patterns is known as a codebook and the representation that is the best match to the error signal is located. The CELP uses the memory location of the represented stored pattern as the encoded error signal. The encoded error signal is called the codeword.

In an effort to eliminate the need for these expansive databases of pre-determined speech patterns, the current invention uses a fractal transform coding process that models the excitation sequence as a series of affine mapping operations. The fractal transform process is described more completely in U.S. Pat. No. 5,065,447 issued Nov. 12, 1991, to Michael F. Barnsley and Alan D. Sloan. The particular fractal transformation coding processes, typically a set of operations, are then transmitted along with the prediction filter coefficients to a decoder. Because speech signals have inherent redundancies, the identified fractal transform coding process uses a process known as an iterated function system on a predetermined or arbitrary estimated excitation signal to generate the actual excitation signal. Thus, high quality and intelligible speech is reproduced without the need to generate a predetermined index of excitation signals. Also, the low transmission rate preserves the efficiency of the LPC coding process, which is typically compromised by other methods that do not use indices. Furthermore, the synthesized speech signal of the present invention is closer to exact speech duplication then any existing processes.

Figure 1:
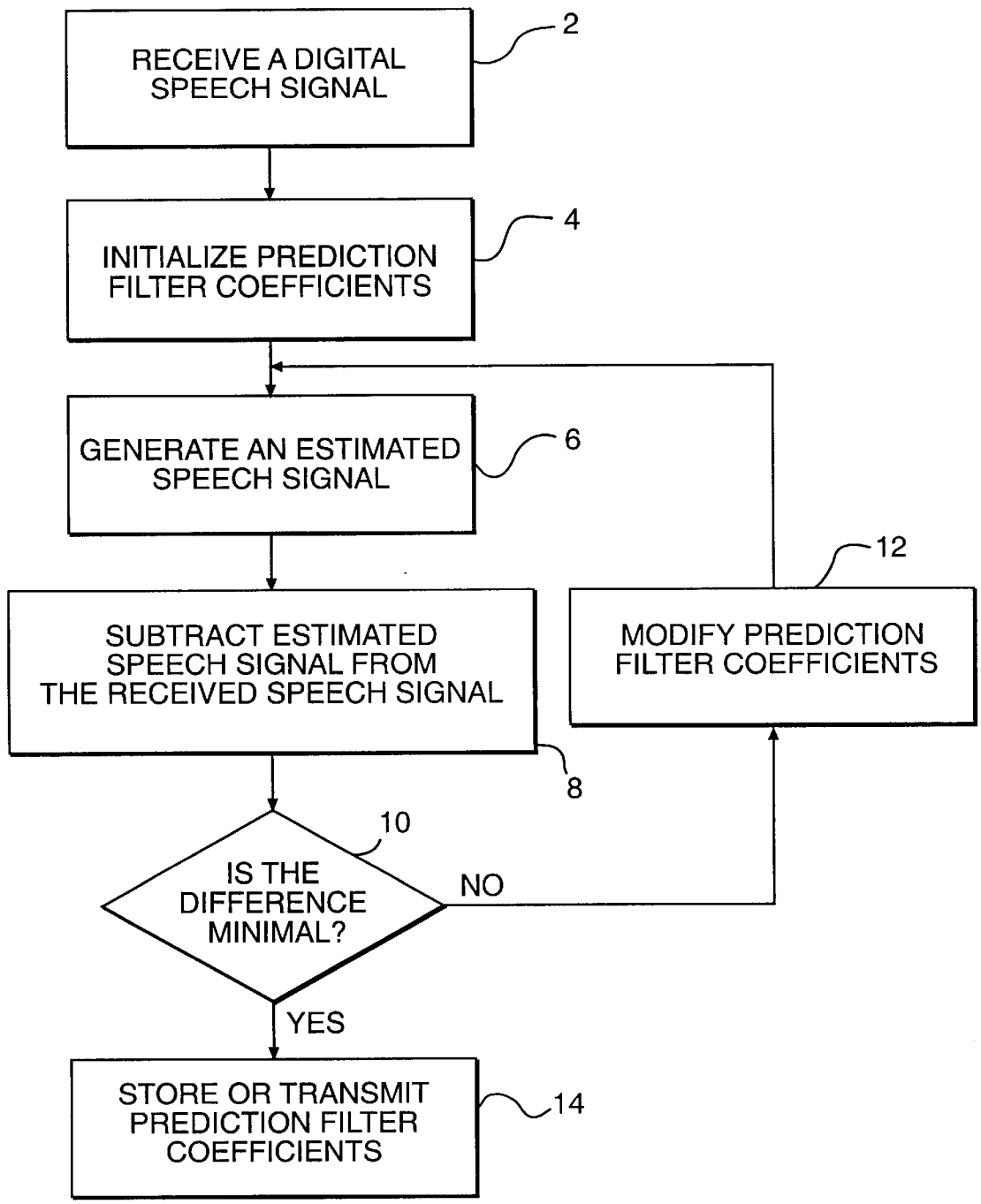
FIG. 1 is a flow diagram showing linear predictive code analysis as performed in the prior art.
Figure 2:
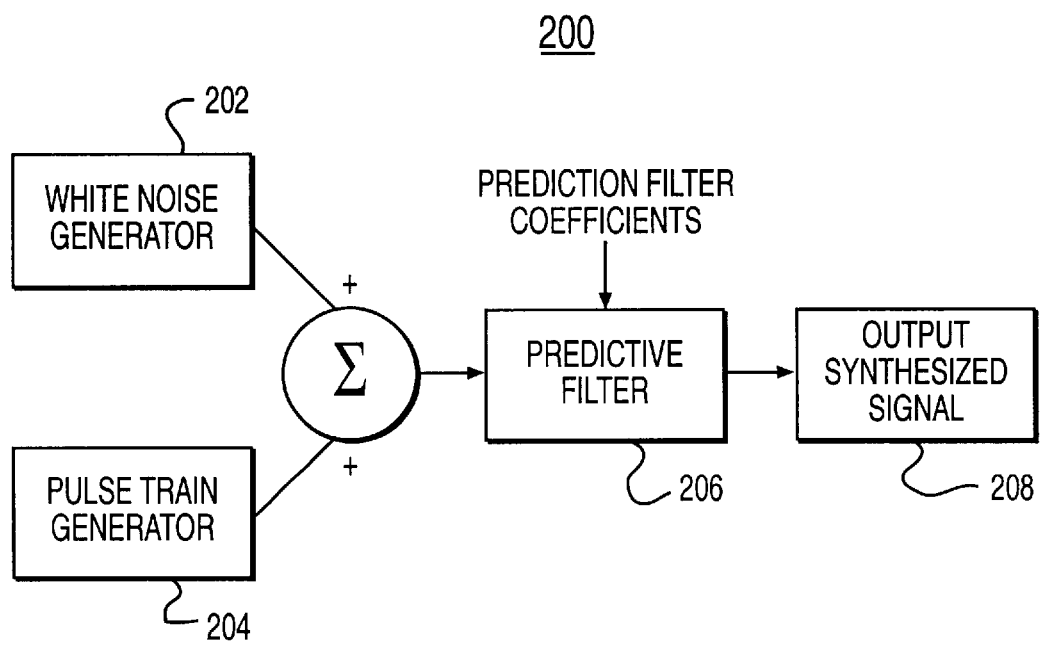
FIG. 2 is a block diagram of a prior art linear predictive decoder.
Figure 3A:
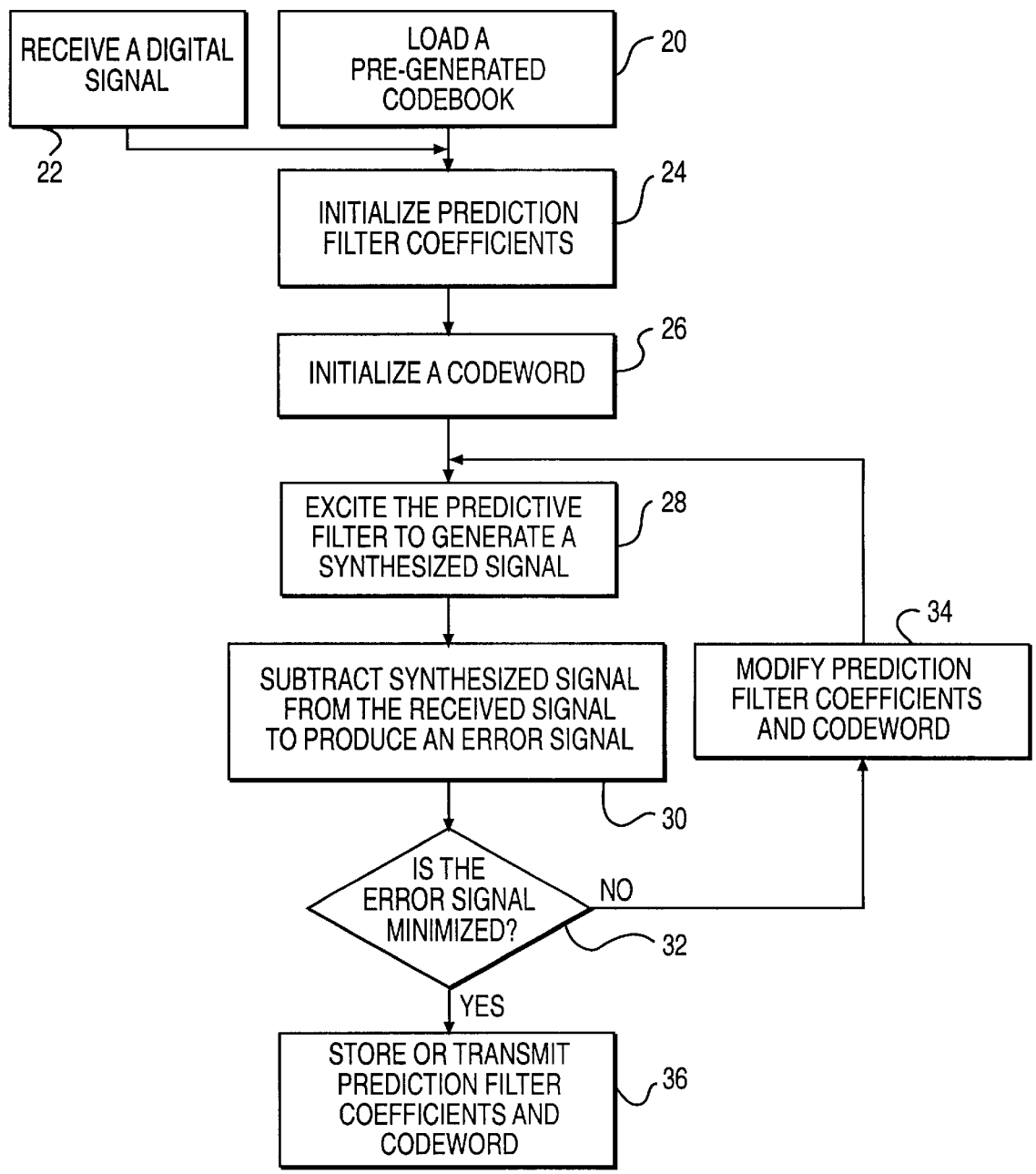
FIGS. 3a and 3b are flow diagrams of the operation of the prior art CELP coding/decoding method.
Figure 3B:
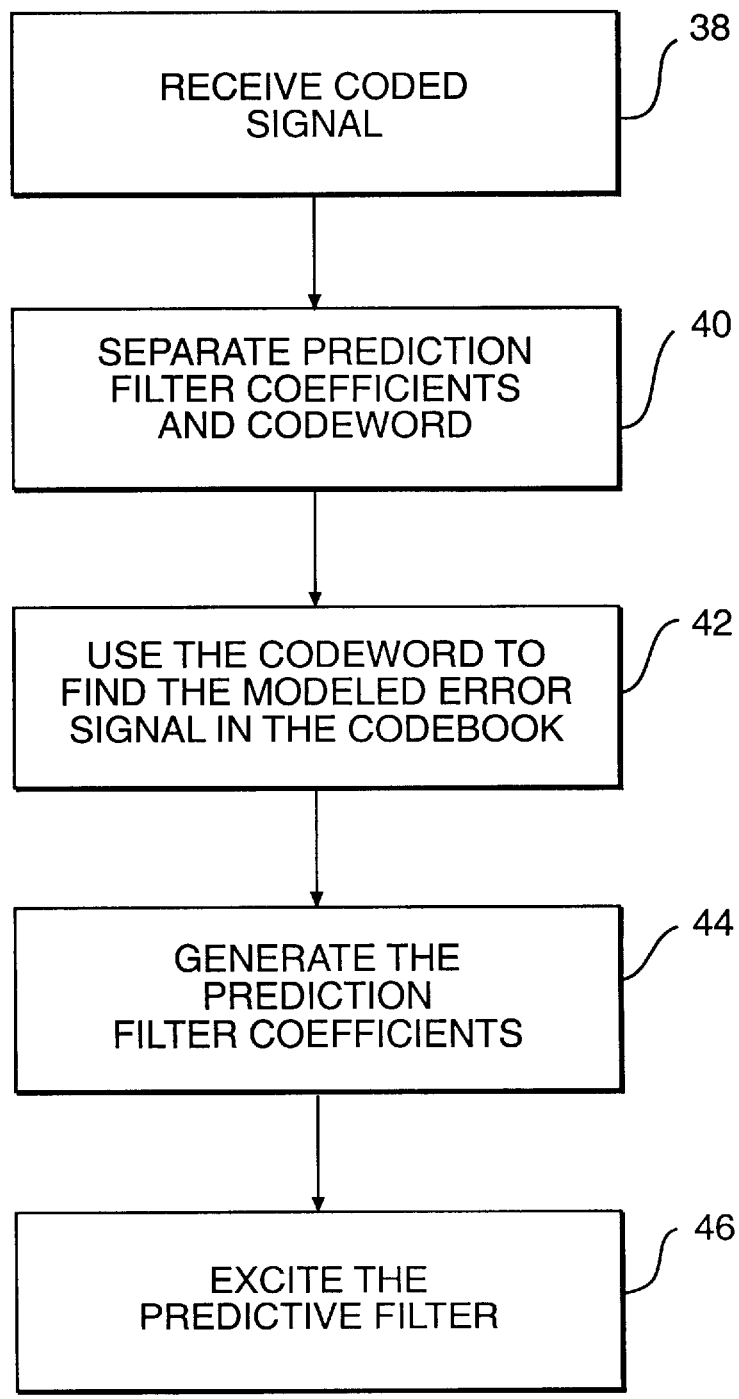
Figure 4:
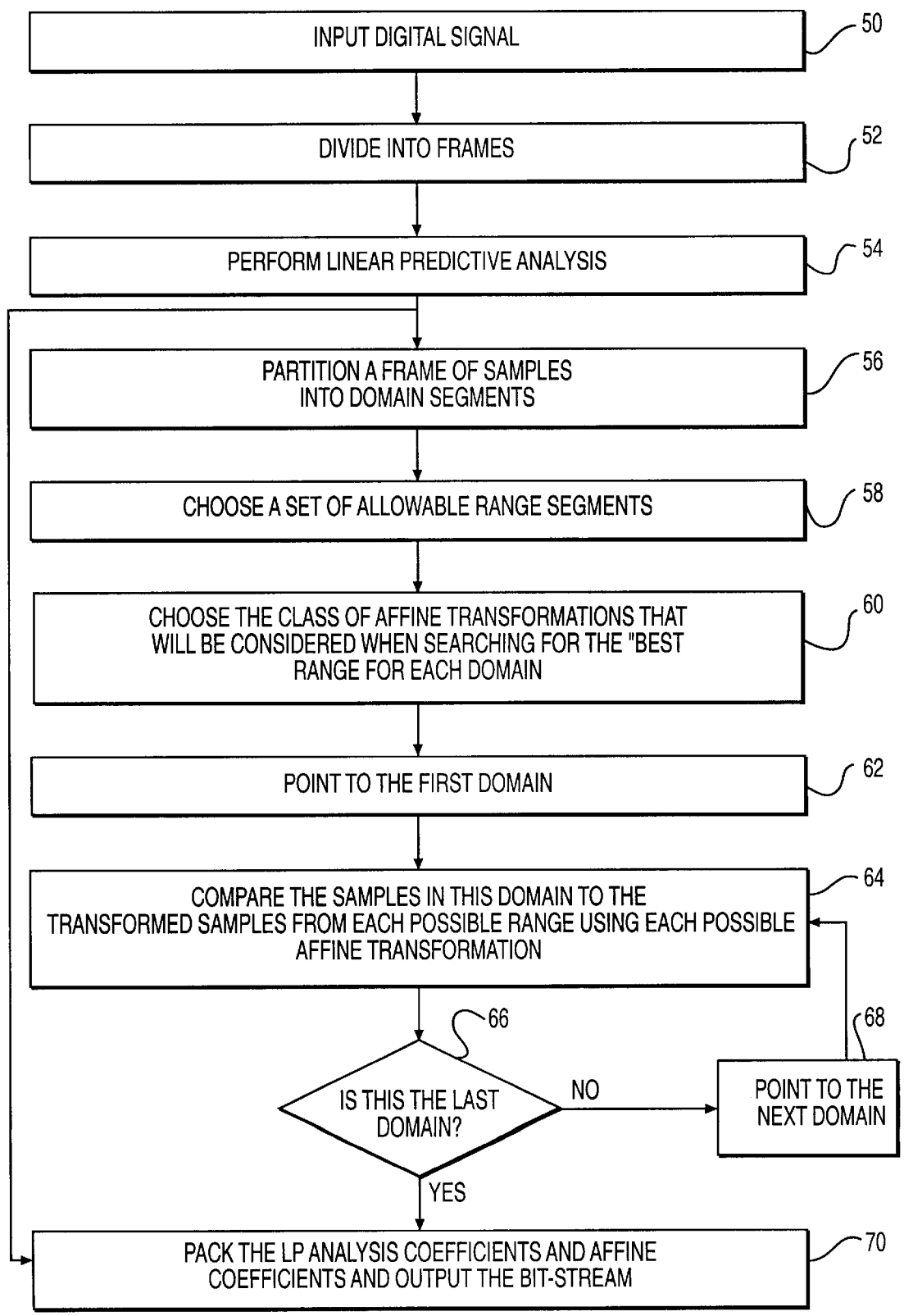
FIG. 4 is a flow diagram showing a method for encoding as performed in an embodiment of the present invention.

In a preferred embodiment, shown in FIG. 4, the linear portion of an input digital speech signal, comprising the short term linear portion of the speech signal developed by the vocal tract, is coded using a linear predictive coding (LPC) method, while the remaining portion of the signal is coded by a fractal transform. Step 50 consists of receiving a digital speech signal into the memory of a data processor. The data processor divides the input signal data into a plurality of groups of data, called "frames," at step 52. Step 54 performs a linear predictive analysis, as shown in FIG. 1, to code each frame. This coding process leaves a residual signal not capable of being captured by the LPC technique. The residual signal constitutes an error signal, and contains nonlinear components.

The error signal is coded using a fractal transform in steps 56–68. The fractal transform employs nonlinear mathematical operations known as "affine transformations," which are ways of reorienting points, functions, and surfaces through rotation, relocation, inversion, stretching, or shrinking. In step 56, the data processor divides the nonlinear portion of the input signal, that is, the error signal, into subframes, called "domain segments." At step 58, the encoder develops additional segments, called "range segments." The preferred embodiment of developing the range segments includes an interim decoding process and will be described in detail below.

Each range segment is operated on by a selected class of affine transformations, step 60. A data processor performs these affine transformations on the range segments. At step 64, each domain segment developed in step 56 is compared to each transformed range segment developed in step 60. The data processor stores the identifiers of the sequence of affine transformations that produced the range segment that most closely matched the domain segment, step 62–68. If all the domain segments have been coded, step 66, then the fractal transformation coefficients and prediction filter coefficients are transmitted or stored as the encoded digital speech signal, step 70. Otherwise, the next domain segment is chosen, step 68, and steps 64 and 66 are repeated.

Note that the stored information is not the modification of the actual error signal or its estimates, but rather a sequence of identifiers of particular affine transformations. The particular sequence of transformations identified and stored in the data processor constitute the fractal transform coefficients. The complete coded speech signal comprises the prediction filter coefficients and the fractal transform coefficients, step 70.

A general description of decoding the coded signal as performed in an embodiment of the present invention will now be described with reference to FIGS. 5.

To reproduce the original speech signal, the coded speech signal is received at step 72. The prediction filter coefficients are separated from the fractal transform coefficients at step 74. Next, a memory buffer, identified as the source buffer, is initialized to a predetermined value, the predetermined value may be arbitrary, step 76. The predetermined initial source buffer content depends on how the ranges segments were generated and will be described in detail below. The source buffer size is equal in size to a frame of the original signal. At step 78 a second memory buffer, identified as the target buffer, is generated and divided into segments equal in size to the domain segments used in the encoding process. Step 80 consists of performing, for each domain segment section of the target buffer, an affine transformation procedure, identified by a fractal transform coefficient, on the source buffer and storing the transformed source buffer values in the target buffer. The contents of the source and target buffer are switched in step 82. Step 84 consists of determining whether a predetermine number of iterations have been performed.

If the last iteration has not been performed, steps 80–84 are repeated. Otherwise, the source buffer constitutes the synthesized nonlinear portion of the original digital signal. This portion is used at step 86 as the excitation for a predictive filter operated in a conventional manner using the prediction filter coefficients which were transmitted as the linear part of the coded signal.

Figure 6:
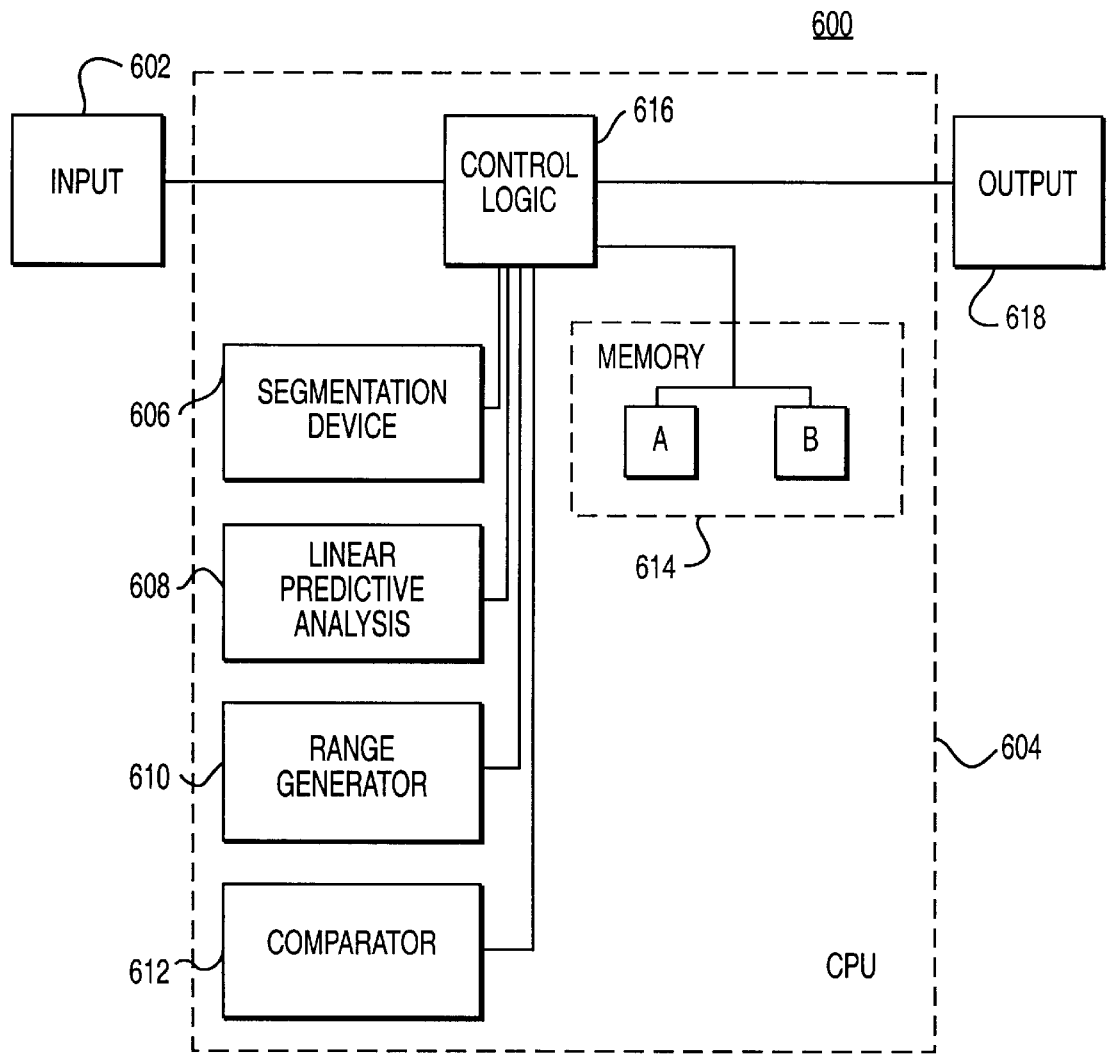
FIG. 6 is a block diagram of an encoding apparatus comprising an embodiment of the present invention.
Figure 7:
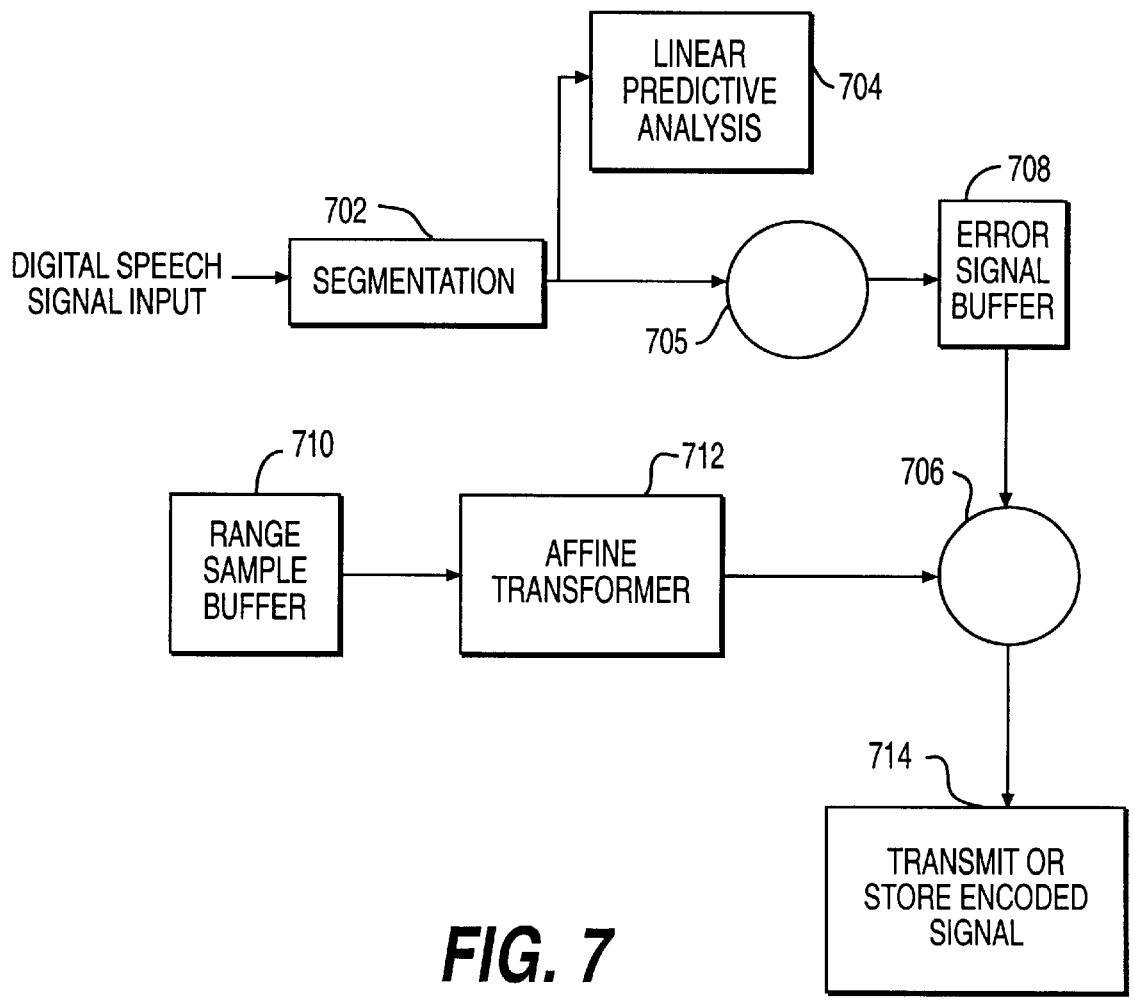
FIG. 7 is a function schematic of the encoding apparatus comprising an embodiment of the present invention.

A block diagram of an encoder 600 constituting a preferred embodiment of the present invention is shown in FIG. 6. Encoder 600 includes an input device 602. Input device 602, such as an analog-to-digital converter, is connected to a central processor unit (CPU) 604. CPU 604 consists of a segmentation device 606, a linear predictive analyzer 608, a range generator 610, a comparator 612, memory 614, and control logic 616. Control logic 616 and memory 614 contain the programs necessary to initiate the encoding process. The CPU is also connected to an output device 618. These pieces perform the method described using FIG. 4 above and as represented by the function schematic FIG. 7.

Functionally, a digital speech signal is inputted to segmentation device 702. Segmentation device 702 divides the signal into frames, as shown at step 52 of FIG. 4. A linear predictive analysis 704 is performed to generate prediction filter coefficients and comparator 705 determines if the error signal is minimized, as shown in FIG. 1. Once the linear predictive analysis 704 and comparator 705 determine the error signal is minimized, the error signal is stored in memory designated as error signal buffer 708. As shown at step 58 of FIG. 4, allowable range segments are loaded into the range sample buffer 710. The range segments were generated by range generator 610, FIG. 6. When the range generator develops the range segments, it performs affine transformations, functionally represented as affine transformer 712. The affine transformed range segments are compared to the error signal and comparator 706 selects the range segment that most closely matches the error signal. The final function block entails transmitting (or storing) the encoded digital speech signal 714.

Figure 8:
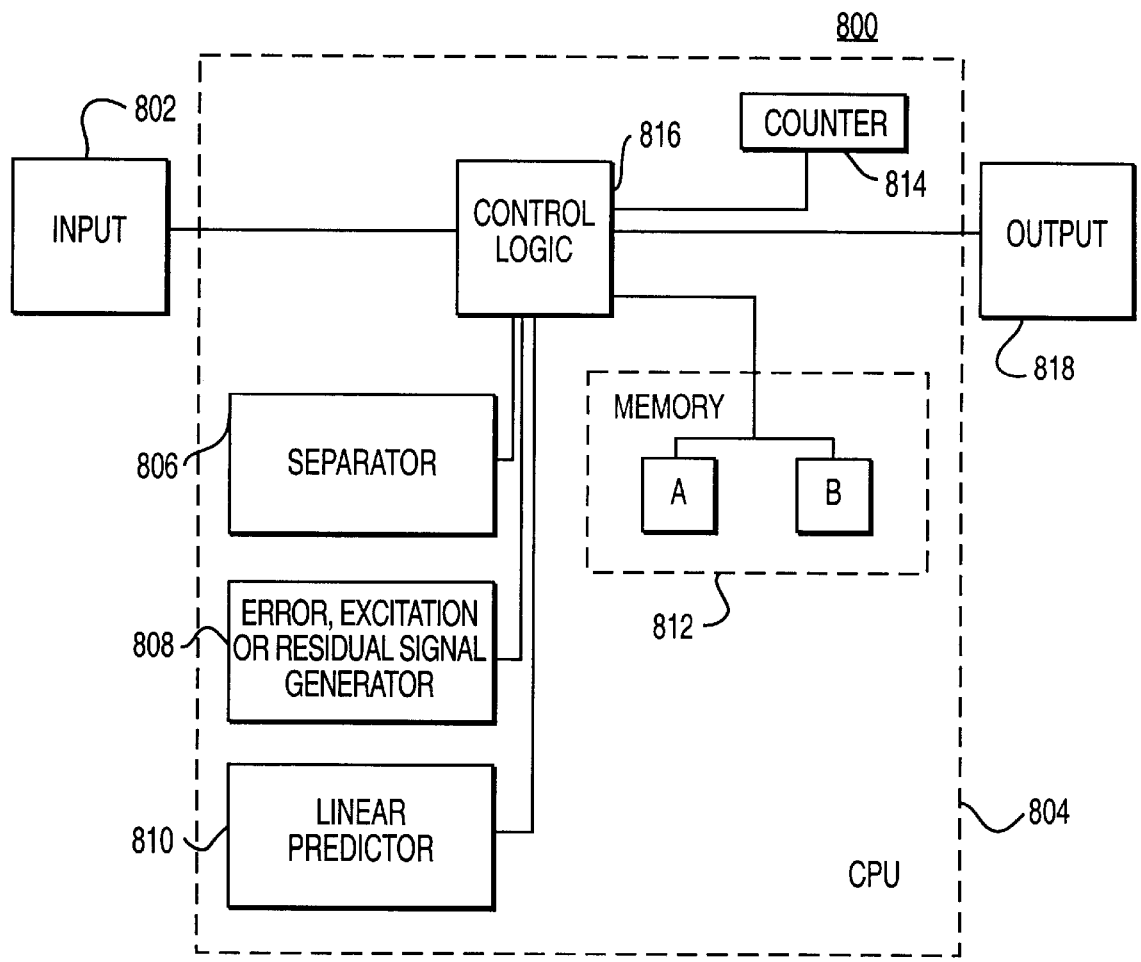
FIG. 8 is a block diagram of data flow in an embodiment of the present invention.

FIG. 8 shows a block diagram of a decoder 800, constituting another aspect of the present invention. Decoder 800 includes an input device 802 capable of receiving an encoded speech signal, either from a stored or transmitted medium. Input device 802, which may be a modem or other suitable device, is connected to a CPU 804, which includes a separator 806, an error signal generator 808, a linear predictor 810, memory 812, a counter 814 and a control logic 816. An output device 818, such as a digital-to-analog converter, is attached to CPU 804.

Decoder 800 thus synthesizes the long term pitch portion of the speech signal developed by the lungs, the nonlinear portion of the speech signal due to the turbulence over the vocal tract, and the short term linear portion of the original speech signal formed by the vocal tract. This synthesis is done without any need for expansive and computationally intensive indices or databases of pre-determined speech patterns. Also, the invention requires only a low transmission rate, thus preserving the efficiency of the LPC coding process, which is typically compromised by other methods that do not require the indices or databases. Furthermore, the system presents a method that is more capable of exact speech duplication then existing systems.

Figure 9A:
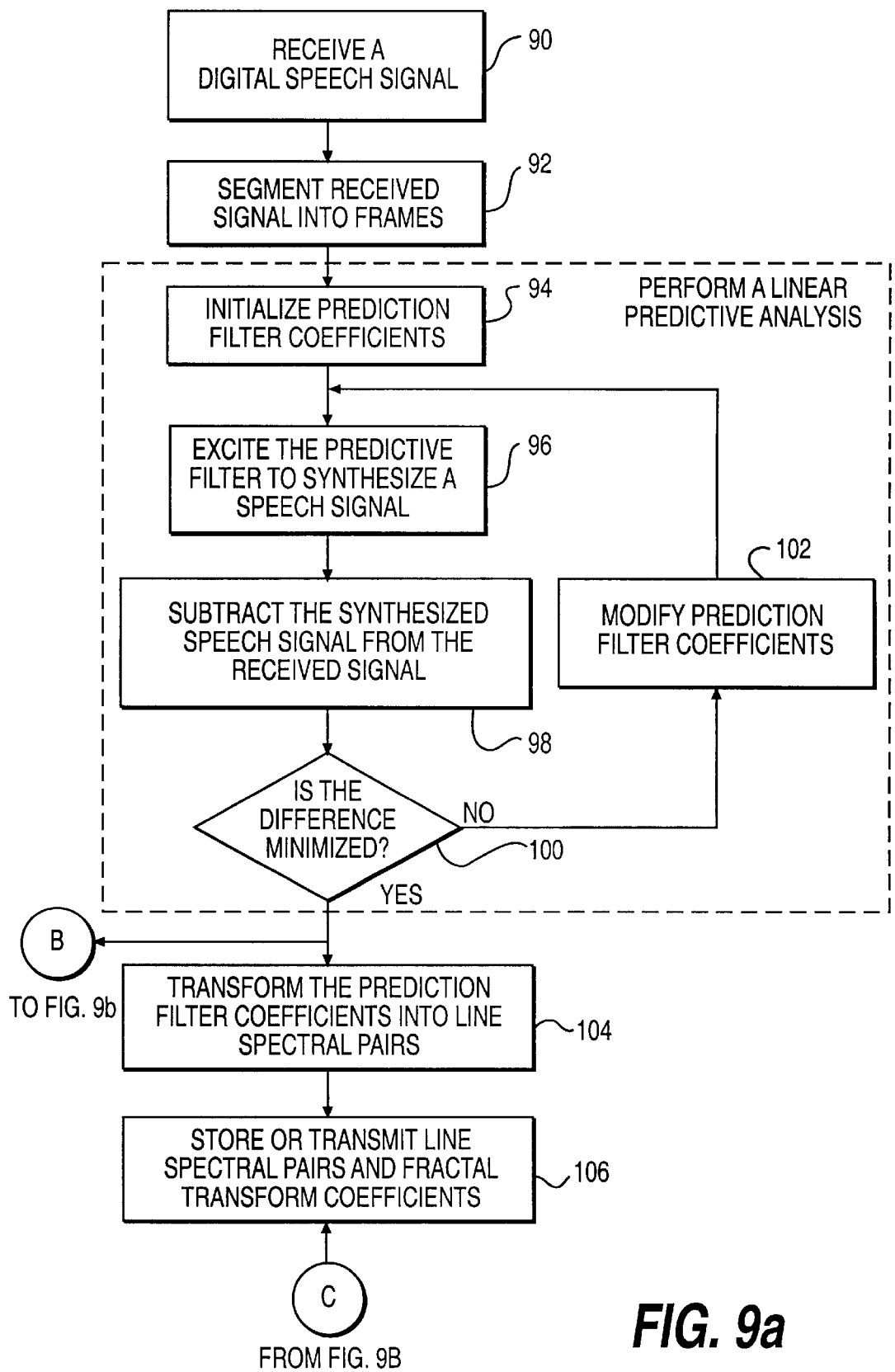
FIG. 9a and 9b are a detailed flow diagram showing the method for performing encoding as performed in an embodiment of the present invention.
Figure 9B:
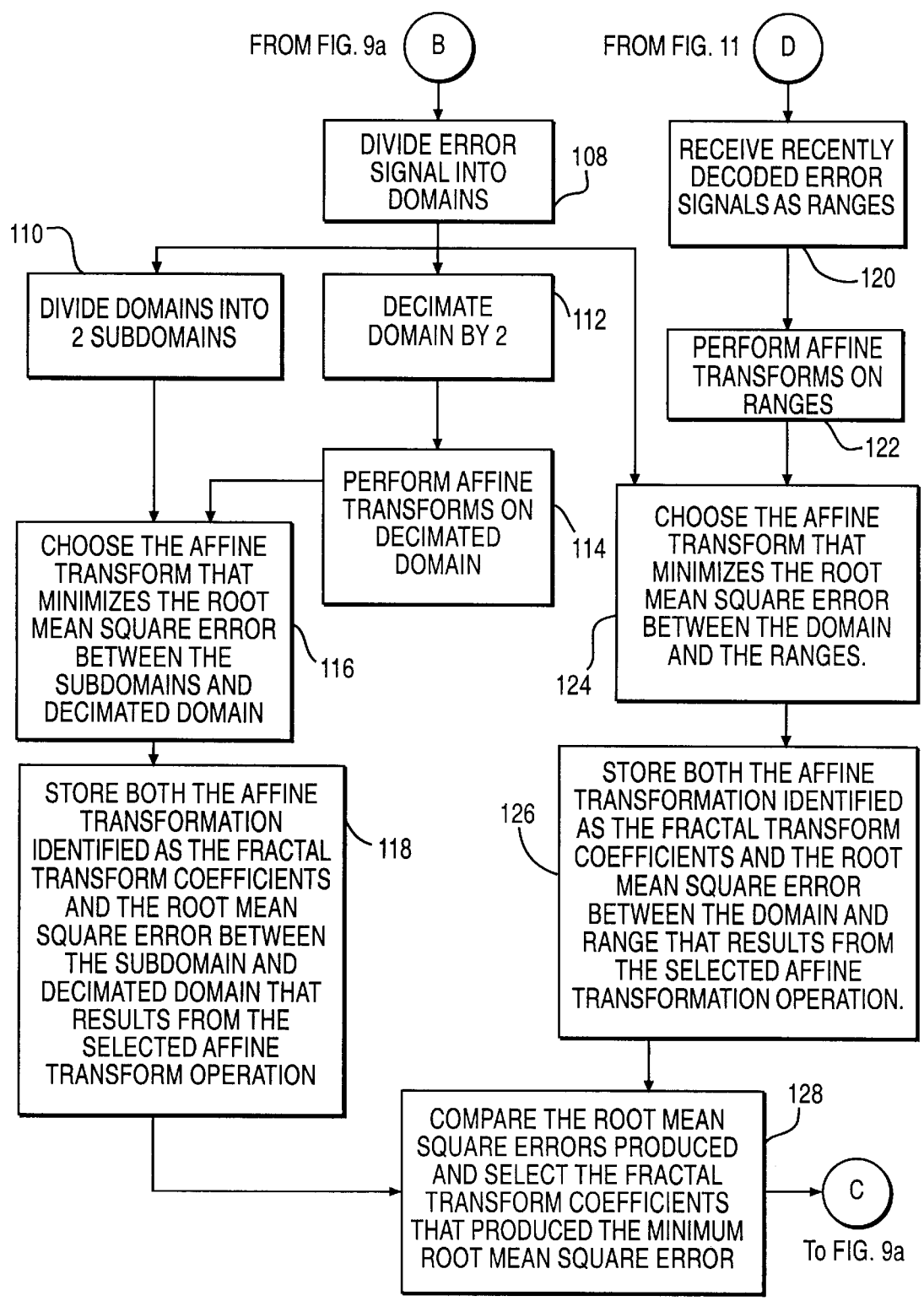

FIGS. 9a and 9b show a method for generating range segments, shown generally at step 58 of FIG. 4. Steps 90–102 and 108 are as described in FIG. 4 steps 50–56. To generate the range segments for each domain segment, each domain segment is further subdivided, at step 110, into two subdomain segments preferably of equal size. At step 112, the information content of the domain segment is decimated, that is reduced by a factor of two. At step 114 a selected class of affine transformations are applied to each decimated domain segment. At step 116, the affine transformation is chosen such that the root mean square (RMS) error between the subdomain segments and the transformed decimated domain segment is minimized. The data processor stores an identifier of the selected affine transformations as the fractal transform coefficients, along with the RMS error between the decimated domain segment transformed by the selected affine transformation and subdomain segments, step 118.

In this embodiment, the encoder contains that portion of the decoder that synthesizes the error signal from the encoded error signal. The decoder portion is used to generate additional range segments. A preferred embodiment of the decoder portion of the encoder is described in detail below. Essentially, the decoder portion of the encoder works by receiving, at step 120, a previously encoded speech signal, either from computer memory or from a transmission device, and generating the error signal as described by steps 72–86, as shown in FIG. 5 and described above, or steps 148–156, as shown in FIG. 11 and described in detail below. This decoded error signal is used as an additional range segment by the encoder. At step 122, a selected class of affine transformations are performed on the range segments. At step 124, the affine transformation is chosen such that the RMS error between the transformed range segments and the domain segment is minimized. At step 126, the data processor stores an identifier of the selected affine transformation as the fractal transform coefficients, along with the RMS error between the transformed range segments and the domain segment.

The minimum RMS error from using the decimated domain segment as a range segment is compared to the minimum RMS error from using previously decoded error signal as a range segment and the affine transformation that resulted in the minimum RMS error is stored as the encoded error signal, which represents the long term pitch portion and nonlinear turbulent portion of the speech signal step 128. The range segment used, i.e., the decimated domain segment or previously decoded error signals, is identified by at least one bit of information added to the coded signal.

Additionally, in the preferred embodiment, the prediction filter coefficients are further modified into line spectral pairs at step 104 of FIG. 9a in accordance with industry-accepted standards. Thus, the line spectral pairs and the fractal transform coefficients are the encoded form of the speech signal, step 106. In the preferred embodiment, the encoded speech signal can be transmitted at about 5.1 kbps.

Figure 10:
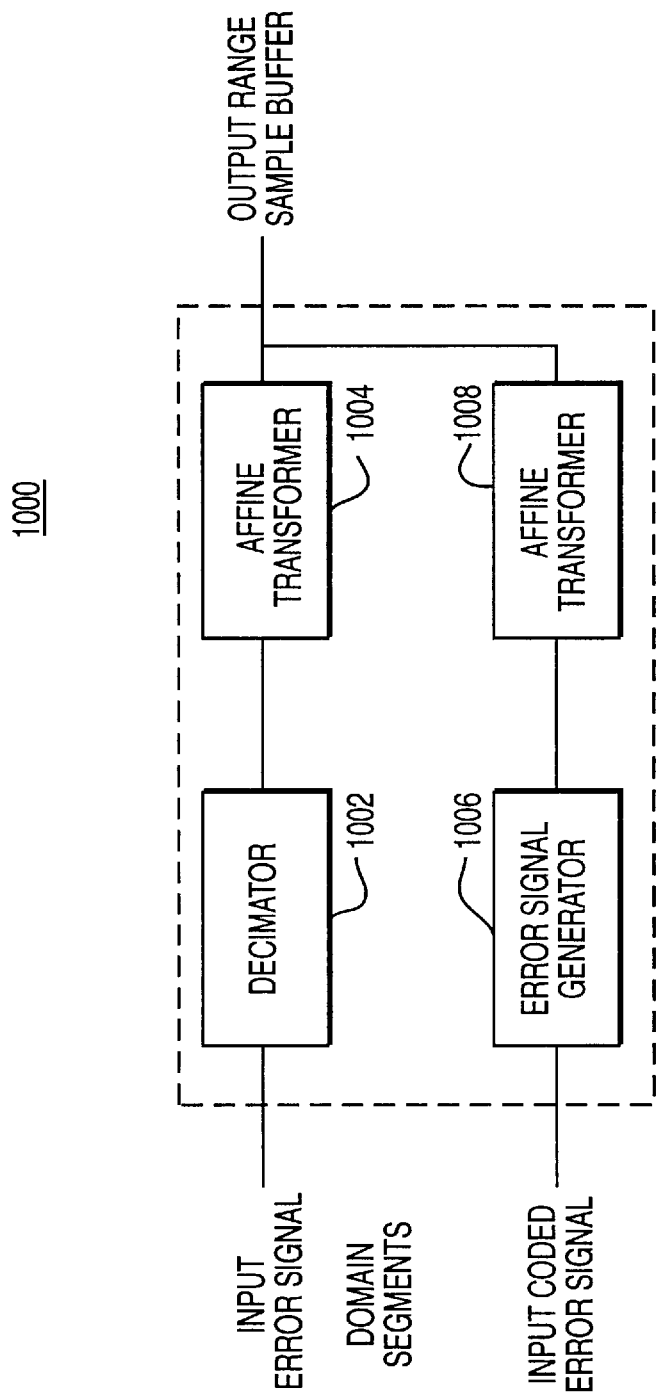
FIG. 10 is a block diagram of an apparatus comprising a preferred embodiment of the range generator for the present invention.

FIG. 10 shows a preferred embodiment of a range generator. Range generator 1000 receives the current error signal domain segment and inputs it to a decimator 1002. Affine transformer 1004 then performs a select class of affine transformations on the signal and outputs the transformed signal to the range sample buffer. Additionally, range generator 1000 receives a coded error signal and error signal generator 1006 decodes that signal, see generally steps 133 and 140–156 of FIG. 11. Affine transformer 1008 then performs a select class of affine transformations of the signal and outputs the transformed signal to the range sample buffer.

Figure 11:
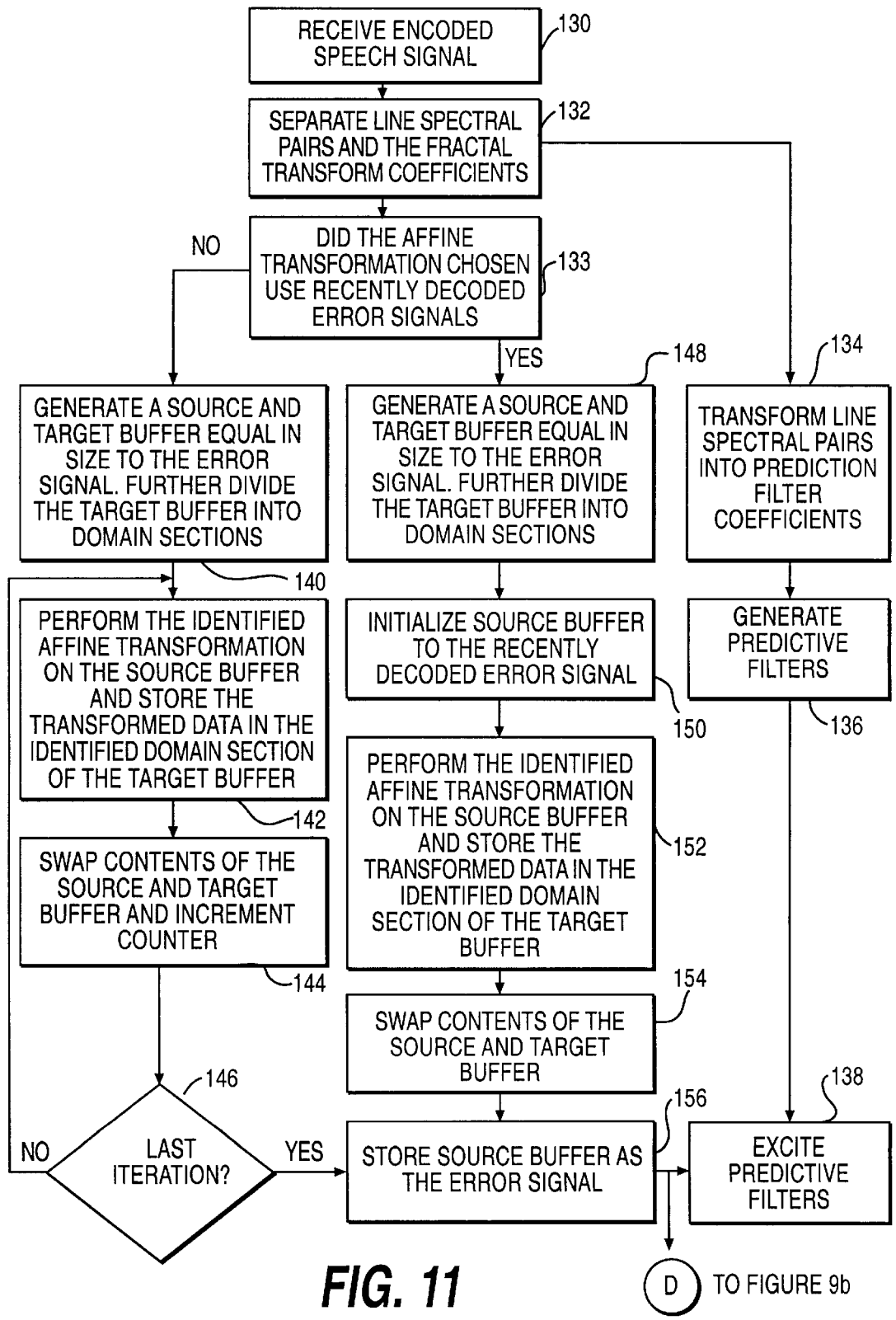
FIG. 11 is a detailed flow diagram showing a method for decoding as performed in an embodiment of the present invention.

FIG. 11 is a logic flow chart of the speech synthesis aspect of the present invention, including the process of choosing recently decoded error signals as the closest range segment. The stored or transmitted encoded speech is imported to a data processor memory, step 130. The data processor separates the line spectral pairs and the fractal transform coefficients, step 132. The data processor transforms the line spectral pairs into prediction filter coefficients according to industry standards, step 134. At step 136, the prediction filter coefficients are used to generate predictive filters. The fractal transform coefficients are used to reproduce the error signal and excite the predictive filter to generate the synthesized speech at step 138.

The process used to generate the error signal depends upon whether the fractal coefficients were arrived at by the current domain segment mapped to itself or by recently decoded range segments mapped to the domain. The process actually used by the encoder is represented in the encoded speech signal by at least a one-bit identifier.

Figure 5:
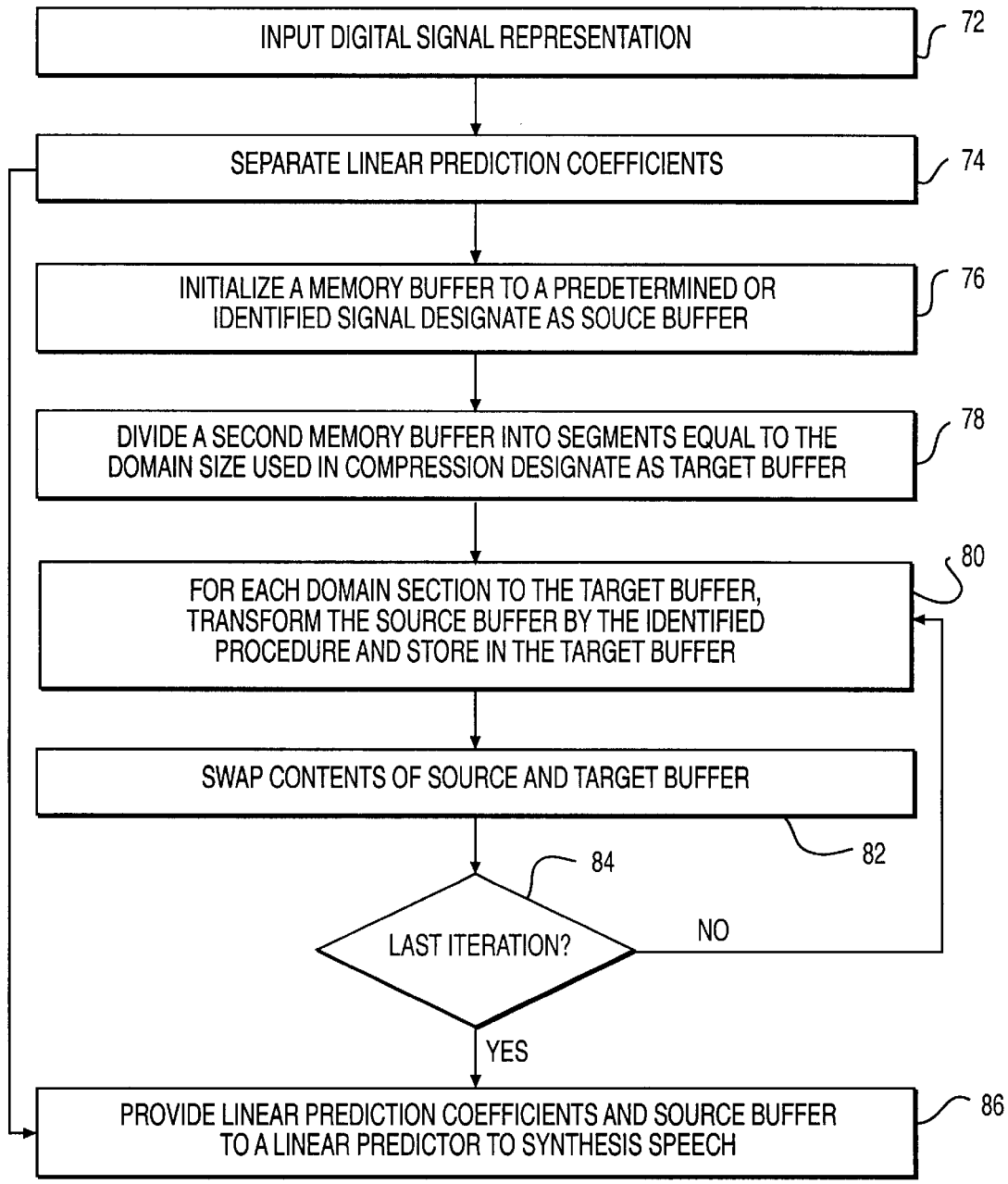
FIG. 5 is a flow diagram showing a method for decoding as performed in an embodiment of the present invention.

If the fractal coefficients were developed by mapping the current domain segment mapped to itself, then the decoding process steps 140–146 are as described by FIG. 5, steps 76–84. The output can be used for either recently decoded samples in the encoding process (see above) or output to the predictive filters to produce synthesized speech.

If the fractal coefficients were developed by mapping recently decoded error signal range segments onto the domain segment, then the decoding process, is essentially the same as described in FIG. 5, steps 76–84. However, step 148 includes initializing the source buffer to the recently decoded error signal that was used to generate the range segment instead of initializing the buffer to a random starting value. The other difference is, because the source buffer was initialized to a recently decoded error signal, only one iteration of the transformation procedure is performed on the source buffer. The source buffer data is outputted as the error (excitation/residual) signal, step 156. The output can be used for either recently decoded error signals in the encoding process (see above) or the error signal used to excite the predictive filters to produce synthesized speech.

This present invention, encoder and decoder, can be implemented on, for example, a 33 MHz 386 personal computer with a math coprocessor, 8 Mbytes of RAM and 10 Mbytes of Hard Disk, or better. It will be apparent to those skilled in the art that various modifications and variations can be made in the method of the present invention and in construction of the preferred embodiments without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for encoding a digital signal, comprising the steps of:

receiving a digital signal;

encoding the received digital signal using LPC methods to separate and encode a linear portion of the received digital signal;

to obtain a set of prediction filter coefficients;

encoding a residual portion of the received digital signal using a fractal transformation procedure to obtain an encoded error signal; and supplying the prediction filter coefficients and the encoded error signal as an encoded digital signal.

2. A method as recited in claim 1 wherein the residual portion of the digital signal comprises a LPC residual signal.

3. A method for encoding a digital speech signal, comprising the steps performed by a data processor of:

receiving a digital speech signal;

generating a plurality of frames from the received digital speech signal;

performing a linear predictive code analysis on the frames to determine corresponding prediction filter coefficients;

comparing a speech signal based on the prediction filter coefficients with the received digital speech signal to create an error signal;

dividing the error signal into nonoverlapping subframes;

creating a plurality of range segments for the nonoverlapping subframes, where each range segment is represented by a fractal transformation procedure;

selecting, for the nonoverlapping subframes, the range segment which most closely corresponds to the nonoverlapping subframe; and representing the digital input as the prediction filter coefficients and the corresponding fractal transformation procedure.

4. A method as recited in claim 3 wherein the step of creating a plurality of range segments comprises using the nonoverlapping subframes.

5. A method as recited in claim 4 wherein the step of creating a plurality of range segments comprises the substeps of:

dividing each subframe into nonoverlapping subdomain segments; and decimating the subframe by a factor of two and performing corresponding fractal transformations.

6. A method as recited in claim 5 wherein the substep of dividing each subframe into nonoverlapping subdomain segments comprises creating subdomain segments of equal size.

7. A method as recited in claim 5 comprising selecting the decimated subframe that most closely matches the subdomain segments as the one that produces the minimum total root mean square difference.

8. A method for decoding a digital signal, comprising the steps performed by a data processor of:

receiving an encoded digital signal;

separating the encoded digital signal into a prediction filter coefficients portion and an encoded error signal portion;

generating an error signal from the encoded error signal portion using a fractal transformation procedure;

generating a predictive filter from the prediction filter coefficients portion; and exciting the generated predictive filter with the generated error signal to produce the original digital signal.

9. A method for decoding a speech signal encoded by the method of claim 4 comprising the steps performed by a data processor of:

receiving an encoded speech signal;

separating the encoded speech signal into a prediction filter coefficients portion and an encoded error signal portion;

generating a predictive filters from the prediction filter coefficients portion;

storing a predetermined digital signal in a memory buffer designated as a source buffer;

determining from the encoded error signal the fractal transformation performed on an identified portion of the source buffer and applying that procedure to that portion of the source buffer;

storing the modified source buffer data in a separate buffer designated as the target buffer;

repeating the determining and target buffer storing steps, with the target buffer being considered as the source buffer, until predetermined criteria are met; and providing the source buffer as input to the generated predictive filters to synthesize the digital speech signal.

10. A method for digital signal encoding and decoding comprising:

receiving a digital signal;

encoding the received digital signal using LPC methods to separate and encode a linear portion of the received digital signal to obtain a set of prediction filter coefficients;

encoding a residual portion of the received digital signal using a fractal transformation procedure to obtain an encoded error signal;

supplying the prediction filter coefficients and the encoded error signal as an encoded digital signal;

receiving an encoded digital signal;

separating the encoded digital signal into a prediction filter coefficients portion and a encoded error signal portion;

generating an error signal from the encoded error signal portion using a fractal transformation procedure;

generating a predictive filter from the prediction filter coefficients portion;

exciting the generated predictive filter with the generated error signal to produce the original digital signal.

11. A method as recited in claim 10 wherein the residual portion comprises a LPC residual signal.

12. A method for digital speech signal encoding and decoding comprising the steps performed by a data processor of:

receiving a digital speech signal;

generating a plurality of frames from the received digital speech signal;

performing a linear predictive code analysis on the frames to determine corresponding prediction filter coefficients;

comparing a speech signal based on the prediction filter coefficients with the received digital speech signal to create an error signal;

dividing the error signal into nonoverlapping subframes;

creating a plurality of range segments for the nonoverlapping subframes, where each range segment is represented by a fractal transformation procedure;

selecting, for the nonoverlapping subframes, the range segment which most closely corresponds to the nonoverlapping subframe;

representing the digital input as an encoded speech signal comprising the prediction filter coefficients and an encoded error signal corresponding to the fractal transformation procedure;

receiving the encoded speech signal;

separating the encoded speech signal into a prediction filter coefficients portion and an encoded error signal portion;

generating a predictive filter from the prediction filter coefficients portion;

storing a predetermined digital signal in a memory buffer designated as a source buffer;

determining from the encoded error signal the fractal transformation procedure performed on an identified portion of the source buffer and applying that procedure to that portion of the source buffer;

storing the modified source buffer data in a separate buffer designated as the target buffer;

repeating the determining and target buffer storing steps, with the target buffer being considered as the source buffer, until predetermined criteria are met; and providing the source buffer as input to the generated predictive filters to synthesize the digital speech signal.

13. A method as recited in claim 12 wherein the step of creating a plurality of range segments comprises using the nonoverlapping subframes to create a plurality of range segments.

14. A method as recited in claim 13 wherein the step of creating a plurality of range segments comprises the substeps of:

dividing each subframe into nonoverlapping subdomain segments; and reducing the size of the subframe by a factor of two and performing corresponding fractal transformation procedures.

15. A method a recited in claim 14 wherein the step of dividing each subframe into nonoverlapping subdomain segments comprises creating subdomain segments of equal size.

16. A method as recited in claim 15 wherein the step of using decoded error signals to generate a plurality of range segments comprises substeps of:

receiving an encoded speech signal;

separating the encoded speech signal into a prediction filter coefficients portion and an encoded error signal portion;

storing a predetermined digital signal in a memory buffer designated as a source buffer;

determining from the encoded error signal a fractal transformation procedure performed on an identified portion of the source buffer and applying that fractal transformation procedure to that portion of the source buffer;

storing the modified source buffer data in a separate buffer designated as the target buffer;

repeating the determining and target buffer storing steps, with the target buffer being considered as the source buffer, until predetermined criteria are met;

perform fractal transformation procedures on the source buffer; and provide the source buffer as a range segment.

17. A method as recited in claim 16 wherein the step of storing a predetermined digital signal in a memory buffer comprises using a decoded error signal as the predetermined digital signal.

18. A method as recited in claim 15 comprising the steps of:

dividing each subframe into nonoverlapping subdomain segments;

decimating the subframe by a factor of two and performing corresponding procedures;

receiving an encoded speech signal;

separating the encoded speech signal into a prediction filter coefficients portion and an encoded error signal portion;

storing a predetermined digital signal in a memory buffer designated as a source buffer;

determining from the encoded error signal the fractal transformation procedure performed on an identified portion of the source buffer and applying that procedure to that portion of the source buffer;

storing the modified source buffer data in a separate buffer designated as the target buffer;

repeating the determining and target buffer storing steps, with the target buffer being considered as the source buffer, until predetermined criteria are met;

perform a fractal transformation on the source buffer; and provide the source buffer as a range segment.

19. A method as recited in claim 18 wherein the step of dividing each subframe into nonoverlapping subdomain segments comprises creating subdomain segments equal in size.

20. A method as recited in claim 18 comprising selecting the range segment that most closely matches the domain segment as the range segment that produces the minimum total root mean square error difference.

21. A method as recited in claim 12 comprising using decoded error signals to generate a plurality of range segments.

22. A method as recited in claim 12 wherein the step of creating a plurality of range segments comprises using nonoverlapping subframes and decoded error signals to create a plurality of range segments.

23. An apparatus for encoding a digital signal comprising:

means for receiving the digital signal;

means for encoding the received digital signal using LPC methods to separate and encode a linear portion of the received digital signal;

to obtain a set of prediction filter coefficients;

means for encoding a residual portion of the received digital signal using a fractal transformation procedure to obtain an encoded error signal; and means for supplying the prediction filter coefficients and the encoded error signal as an encoded digital signal.

24. An apparatus for decoding a digital signal comprising:

means for receiving an encoded digital signal;

separating the encoded digital signal into a prediction filter coefficients portion and an encoded error signal portion;

means for generating an error signal form the encoded error signal portion using a fractal transformation procedure;

means for generating a predictive filter from the prediction filter coefficients portion; and means for exciting the generated predictive filter with the generated error signal to produce the original digital signal.

25. An apparatus for encoding and decoding a digital signal comprising:

means for receiving the digital signal;

means for encoding the received digital signal using LPC methods to separate and encode a linear portion of the received digital signal;

to obtain a set of prediction filter coefficients;

means for encoding a residual portion using a fractal transformation procedure to obtain an encoded error signal;

means for supplying the prediction filter coefficients and the encoded error signal as an encoded digital signal;

means for receiving the encoded digital signal;

separating the encoded digital signal into a prediction filter coefficients portion and an encoded error signal portion;

means for generating an error signal form the encoded error signal portion using the fractal transformation procedure;

means for generating a predictive filter from the prediction filter coefficients portion; and means for exciting the generated predictive filter with the generated error signal to produce the original digital signal.

26. An apparatus for encoding a digital speech signal comprising:

means for receiving the digital speech signal;

means for creating a plurality of frames from the received digital speech signal;

means for performing a linear predictive code analysis and for determining the prediction filter coefficients for a frame;

means for producing an error signal by comparing the synthesized output of the linear predictive analysis with the received digital speech signal;

means for dividing the error signal into nonoverlapping subframes;

means for creating a plurality of range segments, where each range segment is represented by a fractal transformation procedure;

means for selecting, for each of the subframes, the range segment which most closely corresponds to the subframe according to predetermined criteria; and means for representing the digital input as the prediction filter coefficients and the corresponding fractal transformation procedure used to develop the range segment that most closely corresponds to the subframe.

27. An apparatus for decoding a digital speech signal comprising:

means for receiving the encoded digital speech signal;

means for separating the encoded digital speech signal into a prediction filter coefficients portion and an encoded error signal portion;

means for generating predictive filters from the prediction filter coefficients portion;

means for storing a predetermined digital signal in a memory buffer, designated source buffer;

means for determining from the encoded signal a fractal transformation procedure performed on an identified portion of the source buffer and applying that procedure to that portion of the source buffer;

means for storing the modified source buffer in a separate memory buffer, designated target buffer;

means for swapping the content of the source and target buffer;

means for determining whether the source buffer should be modified again; and means of providing the source buffer as output.

28. An apparatus for encoding and decoding a digital speech signal comprising:

means for receiving the digital speech signal;

means for creating a plurality of frames from the received digital speech signal;

means for performing a linear predictive code analysis and for determining the prediction filter coefficients for a frame;

means for producing an error signal by comparing the synthesized output of the linear predictive analysis with the received digital speech signal;

means for dividing the error signal into nonoverlapping subframes;

means for creating a plurality of range segments, where each range segment is represented by a fractal transformation procedure;

means for selecting, for each of the subframes, the range segment which most closely corresponds to the subframe according to predetermined criteria;

means for representing the digital input as the prediction filter coefficients and the corresponding fractal transformation procedure used to develop the range segment that most closely corresponds to the subframe;

means for receiving the encoded digital speech signal;

means for separating the encoded digital speech signal into a prediction filter coefficients portion and an encoded error signal portion;

means for generating predictive filters from the prediction filter coefficients portion;

means for storing a predetermined digital signal in a memory buffer, designated source buffer;

means for determining from the encoded signal the fractal transformation procedure performed on an identified portion of the source buffer and applying that procedure to that portion of the source buffer;

means for storing the modified source buffer in a separate memory buffer, designated target buffer;

means for swapping the content of the source and target buffer;

means for determining whether the source buffer should be modified again; and means of providing the source buffer as output.

* * * * *

UNITED STATES PATENT AND TRADEMARK OFFICE
CERTIFICATE OF CORRECTION

PATENT NO. : 5,822,721
DATED : October 13, 1998
INVENTOR(S) : Steven A. Johnson, et al.

It is certified that error appears in the above-indentified patent and that said Letters Patent is hereby corrected as shown below:

Claim 1, col. 9, lines 16-17, delete ";" and delete line break before "to obtain".

Claim 23, col. 12, lines 55-56, delete ";" and delete line break before "to obtain".

Claim 25, col. 13, lines 16-17, delete ";" and delete line break before "to obtain".

Claim 9, col. 10, line 12, "claim 4" should read --claim 3--.

*Claim 25, col. 13, line 27, "form" should read --from--.

Signed and Sealed this

Twenty-sixth Day of January, 1999

Attest:

Attesting Officer

*Acting Commissioner of Patents and Trademarks*